United States Patent [19]
Russell et al.

[11] Patent Number: 5,735,191
[45] Date of Patent: Apr. 7, 1998

[54] IMPROVED COOKING APPLIANCE FOR MEAT AND BUNS

[76] Inventors: Gordon K. Russell, 21 Edge Valley Dr., Toronto, Ontario, Canada; Clement Ching, 107 Hollywood Ave., North York, Ontario, Canada; Kam Chuen Chan, 5568 Heather Street, Vancouver, British Columbia, Canada, V5Z 3M6

[21] Appl. No.: 877,158

[22] Filed: Jun. 17, 1997

[51] Int. Cl.[6] .............. A47J 27/12; A47J 37/08
[52] U.S. Cl. .............. 99/339; 99/329 R; 99/393; 99/400; 99/427; 99/441; 99/448
[58] Field of Search ............... 99/339, 326–331, 99/385, 393, 400, 401, 420, 427, 448, 441, 446, 447, 450, 389–392; 219/521, 538, 400

[56] References Cited

U.S. PATENT DOCUMENTS

| | | |
|---|---|---|
| 2,716,697 | 8/1955 | Grannan ............... 99/345 |
| 2,913,976 | 11/1959 | Cole ............... 219/538 |
| 2,915,000 | 12/1959 | Hetzel ............... 99/327 |
| 2,925,771 | 2/1960 | Avetta ............... 99/393 |
| 2,941,463 | 6/1960 | Cuia ............... 99/393 |
| 3,007,393 | 11/1961 | Le Doux ............... 99/327 |
| 3,065,688 | 11/1962 | Lindemann ............... 99/329 |
| 3,308,748 | 3/1967 | Jalbert ............... 99/402 |
| 3,391,633 | 7/1968 | Boosalis ............... 99/441 |
| 3,669,002 | 6/1972 | Davidson ............... 99/393 |
| 3,747,507 | 7/1973 | McIntosh ............... 99/339 |
| 3,792,653 | 2/1974 | Davidson ............... 99/339 |
| 4,119,020 | 10/1978 | Sharp et al. ............... 219/521 |

Primary Examiner—Timothy F. Simone

[57] ABSTRACT

An electric appliance, for cooking meat and buns simultaneously, has chambers for holding the meat and buns vertically, heating the meat on both sides and heating the bun on at least one side. The meat may be contained in a novel cage. The bun chamber may have one or two perforated plates for controlling the amount of radiant heat from impinging on the bun, thus affecting whether the bun is warmed or toasted.

15 Claims, 4 Drawing Sheets

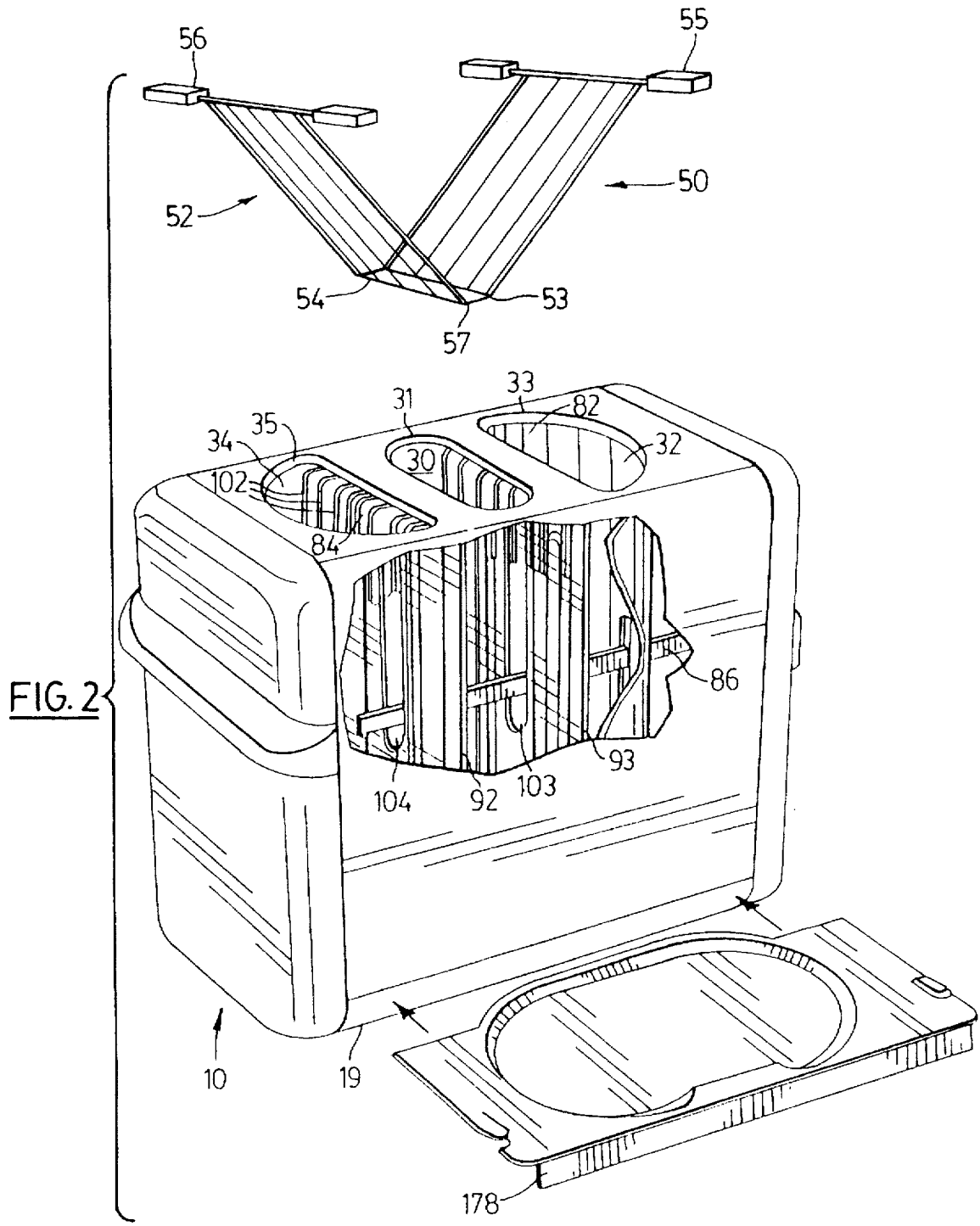

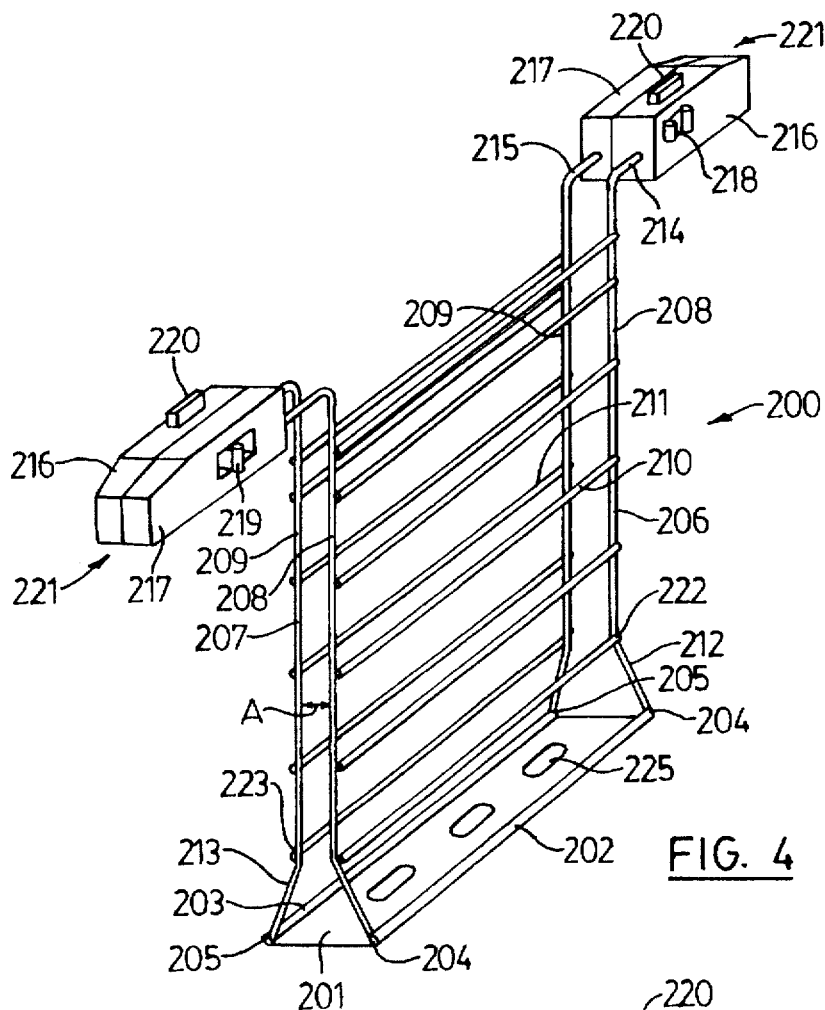
FIG. 4
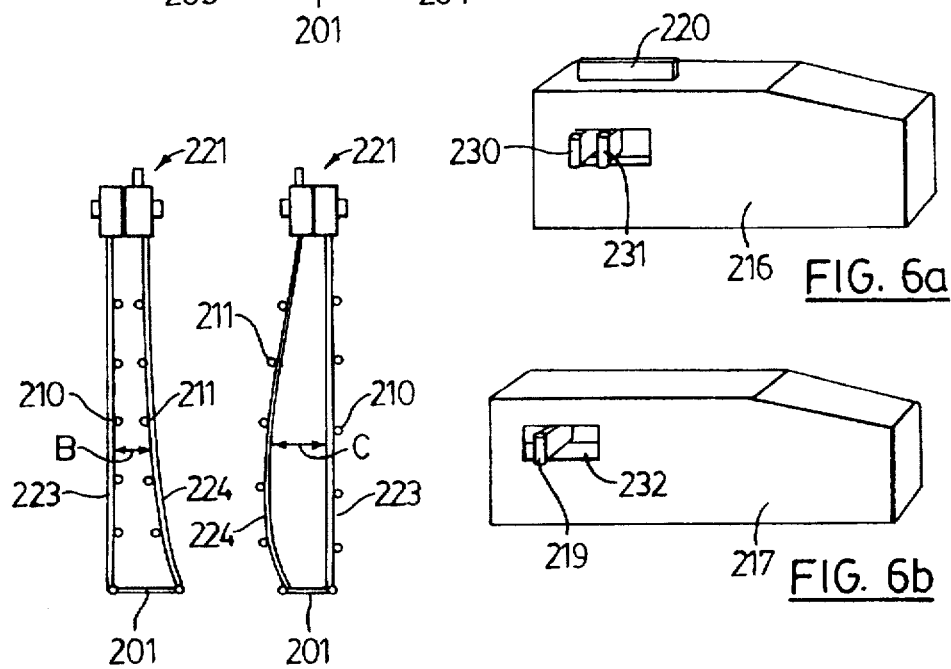
FIG. 5a    FIG. 5b
FIG. 6a
FIG. 6b

IMPROVED COOKING APPLIANCE FOR MEAT AND BUNS

FIELD OF THE INVENTION

The present invention relates to a cooking appliance for simultaneously warming or toasting bread or buns and broiling meats or other foods.

BACKGROUND TO THE INVENTION

Vertical broiling is the best method to cook meats, poultry and fish. The vertical cooking profile drains fats away from the product that is being cooked and produces a less greasy taste sensation and a healthier product. It is well known that cooking in fats increases the fat content of whatever is being cooked, with an absorption of up to 15% more fat. Radiant energy of the vertical broiling method produces carmelization of the natural sugars and proteins on the surface of meat that is cooked. The carmelization process gives the best taste and appearance.

It is known to toast bread slices or buns with radiant heaters. Electric toasters are available, which toast bread slices in the vertical position. It is also known to broil meats, e.g. hamburgers, with radiant heaters or barbecues. It is usual to cook such meats on a horizontal rack. The meat needs turning in order to cook both sides.

It is also known to simultaneously toast buns and cook frankfurters in a vertical position, with radiant heaters as taught by Russell, Taylor, Ching and Chan in U.S. Pat. No. 4,901,631 which issued Feb. 20, 1990.

There is a growing trend for "fast foods" to be prepared in the home. This is evidenced, for example, by the growth of pre-prepared microwavable meals and by the growth of fast food chains such as McDonald's. One of the most popular of foods at such chains is a bun with a variety of meat fillings, notably hamburger but also chicken and fish. In order for such a filled bun to be made at home it is still necessary to cook the meat and toast the bun separately.

It is known that warmed bread or buns are preferred over toasted bread or buns by young people and the elderly. Conventional domestic electric toasters can only accommodate this for bread, by varying the length of time that the bread is in toaster. Even then, there is a tendency for the toast to be lightly toasted rather than warmed. Until now, it is believed that there has been no single apparatus adapted to provide either a warmed bun or a toasted bun.

In order to address such deficiencies in the market, improvements to the toaster as disclosed in U.S. Pat. No. 4,901,631 has been invented.

In the present context, the term "food" encompasses foods which retain their integrity when heated and/or cooked when supported in a vertical position. The term "flat food" encompasses foods which are in substantially flat portions and retain their integrity when heated and/or cooked when supported in a vertical position. Such terms includes food items such as meats, fish, vegetables and sandwiches. For example, the terms encompasses steak, hamburger, chicken and fish fillets, vegetable based items such as soyburgers, bread slices with cheese therebetween, sliced breadfruit and even foods which have surface irregularity, e.g. broccoli. They do not include food items which lose their integrity, e.g. melt when heated, such as frozen yogurt, cheese.

SUMMARY OF THE INVENTION

Accordingly, the present invention provides a cooking appliance for simultaneously heating at least one bread portion and at least one substantially flat food portion, said cooking appliance comprising:

(a) at least one food chamber, where each chamber is for containing a flat two-sided food portion in a vertical position;

(b) first electric element means for heating both sides of the food portion in each food chamber;

(c) at least one bread chamber for containing a bread portion in a vertical position;

(d) second electric element means for heating at least one vertical surface of the bread portion;

(e) food support means for supporting the food portion in the food chamber in a position adjacent the first electric element means to allow heat from the first element means to impinge on the sides of the food portion; and (f) bread support means for supporting the bread portion in the bread chamber in a position adjacent the second element means to allow heat from the second element means to impinge on the vertical surfaces of the bread portions.

In one embodiment the food support means and the bread support means comprise an elevator which may travel between raised and lowered positions, said lower position allowing the food and bread portions to be fully contained in their respective chambers while being exposed to the heat, and the upper position allowing part of the food and bread portions to extend above their respective chambers.

In a further embodiment, there is (g) an elevator control means for manipulating the elevator to the lower position, for temporarily locking the elevator in the lower position; unlocking means to release the elevator from its temporarily locked lower position, and return biasing means for urging the elevator to its upper position;

(h) electrical control means for allowing electric current to heat at least the first element means when the elevator is in its locked lower position, and for allowing electric current to heat the second element means when the elevator is in its locked lower position;

(h) double timer means, i) for controlling a first length of time when electric current is heating at least the first element means, and for releasing the elevator from its locked position, and ii) for controlling a second length of time, separate from the first length of time, when electric current is heating the first and second element means, and for releasing the elevator from its locked position.

In one embodiment the timer has adjusting means for controlling the first and second lengths of time.

In another embodiment, the food support means comprises a removable cage for holding the flat food in the food chamber and the bread support means comprises an elevator which may travel between raised and lowered positions, said lower position allowing the bread portion to be fully contained in the bread chamber while being exposed to the heat, and the upper position allowing part of the bread portion to extend above the bread chamber.

In another embodiment, there is a metal plate between the second electric element means and the bread portion. The metal plate may be perforated.

The invention also provides a cooking appliance for heating a food portion, said cooking appliance comprising:

a) at least one chamber for containing a food portion;

b) heating means for heating at least one side of the food portion;

c) two plates, in face to face contact, each with perforations therein, said plates being placed between the heating means and the food portion;

d) control means for moving one of the plates relative to the other plate so that in a first position, perforations in both plates are in register and perforations in one plate are aligned and correspond to perforations in the other plate, and in a second position the perforations in both plates are not in register and perforations in one plate are not aligned and do not correspond to perforations in the other plate.

In another aspect of the invention, there is provided a removable cage for holding food in a heating chamber of a cooking appliance. The removable cage has a floor member with two longitudinal edges and a width between said longitudinal edges, a first and a second wall member, each wall member having first and second ends; the first ends of each wall member being hingedly attached to a longitudinal edge of the floor member, and the second ends of each wall member being able to be temporarily joined to one another with at least one releasable fastener; said wall members being shaped so that when both wall members are temporarily joined on one side of a plane through the width of the floor member, the distance between portions of the wall members is greater than the width of the floor member, and when both wall members are temporarily joined on the opposing side of the plane through the width of the floor member, the distance between said portions of the wall members in less than the width of the floor member; the wall members also being constructed to allow heat to reach food when the food is trapped between the wall members.

In one embodiment, the wall members are bowed.

In another embodiment, a portion of each wall member, adjacent to the hinge is at an angle relative to a plane through the remaining portion of each wall member.

In a further embodiment, a second end of the first wall member has a releasable fastener for temporarily joining the second end of the first wall member to a second end of the second wall member.

In another embodiment, the wall members comprise a wire frame with wire cross-members.

In another embodiment, the floor member has at least one perforation therein.

In yet another embodiment the releasable fastener comprises a double sided male fastener member on the second end of the one of the wall members and a cooperating double sided releasable female fastener member on the second end of the other wall member.

In a further embodiment, the releasable fastener comprises a fastener member swivelably attached to a rod extending from the second end of the first wall member, wherein the fastener member also has at least one hole into which may fit a rod extending from the second end of the second wall member.

BRIEF DESCRIPTION OF THE DRAWINGS

FIG. 2 is a slightly enlarged perspective view of the cooking appliance of FIG. 1 shown in cut-away section and shown together with a cage and a tray;

FIG. 4 is a perspective view of a preferred cage for use with a vertical cooking appliance.

FIGS. 5a and 5b are end views of a cage in different configurations.

FIGS. 6a and 6b are fasteners useful for releasably joining upper parts of the cages of FIGS. 4, 5a and 5b.

DETAILED DESCRIPTION OF PREFERRED EMBODIMENTS

The Figures are described with reference to cooking meats, e.g. hamburgers, and warming or toasting buns. It is to be understood that meats besides hamburgers may be used. In addition, slices of bread may be used instead of buns. As indicated hereinbefore the present cooking appliance may be used for cooking various kinds of substantially flat foods. Examples of such foods include fillets of fish or fowl such as fillets of cod, chicken or turkey, slices of meat, e.g. steak, pork chops, certain vegetables, e.g. broccoli, processed foods, e.g. vegetable burgers and sandwiches, e.g. tomatoes or cheese between bread slices.

The Figures are described with reference to a single food chamber although it will be understood that there may be two or more food chambers.

Figure 1:
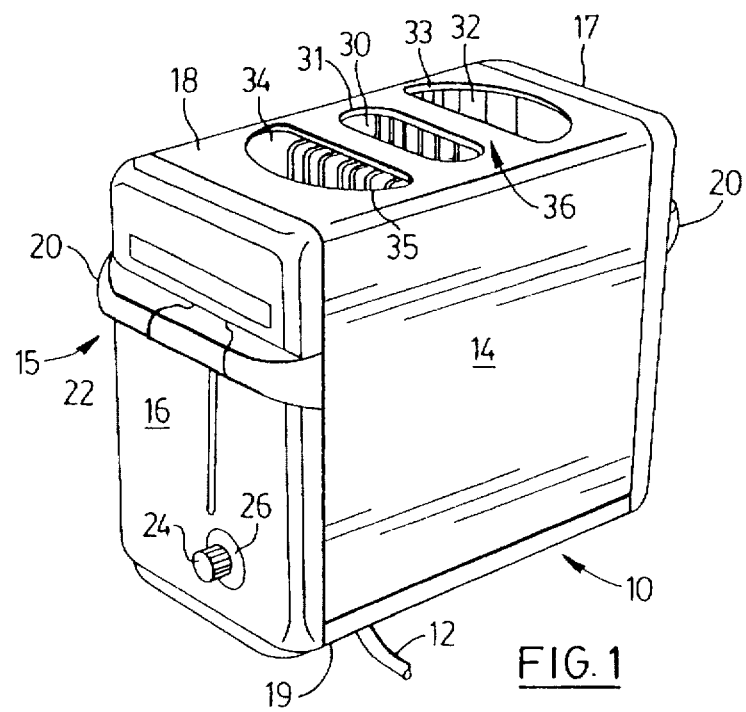
FIG. 1 is a perspective view of a cooking appliance according to the present invention.

FIG. 1 shows at 10 a preferred form of cooking appliance according to the present invention for cooking flat foods. The cooking appliance 10 has an associated electrical cord 12 for providing power to the cooking appliance 10 as described below. Also shown in FIG. 1 is a front 14, a rear 15, a left side 16, a right side (unnumbered), a bottom 19 and a top 18. On each of the left side 16 and the right side are handles 20. A bar handle 22 forms a part of the handle 20. Also shown is a timer adjuster 24 with an associated dial 26. In the embodiment shown in FIG. 1, the timer adjuster 24 is connected to a single timer conventionally used on bread toasters. Turning now to the top 18 of the cooking appliance 10 there are shown a food heating chamber 30 located between two opposed bun heating chambers 32 and 34. These heating chambers have top openings 31, 33 and 35, respectively.

Between the chambers 30 and 32 and between the chambers 30 and 34 are located vertical insulating panels 92, 93 (see FIG. 2). Each vertical insulating panel has a face towards the inside of the food heating chamber 30 and each of the insulating panels 92, 93 has a face towards the inside of a bread heating chamber 32 or 34. Heating elements are provided on these faces to produce radiant heat. For cooking appliances which are intended only to warm the bun, a metal plate may be interposed between the heating elements. Depending on the desired rate of heating the bun, the plate may have apertures therein to permit faster heating of the bun, as will be described hereinafter in relation to FIGS. 8 and 9.

Figure 3:
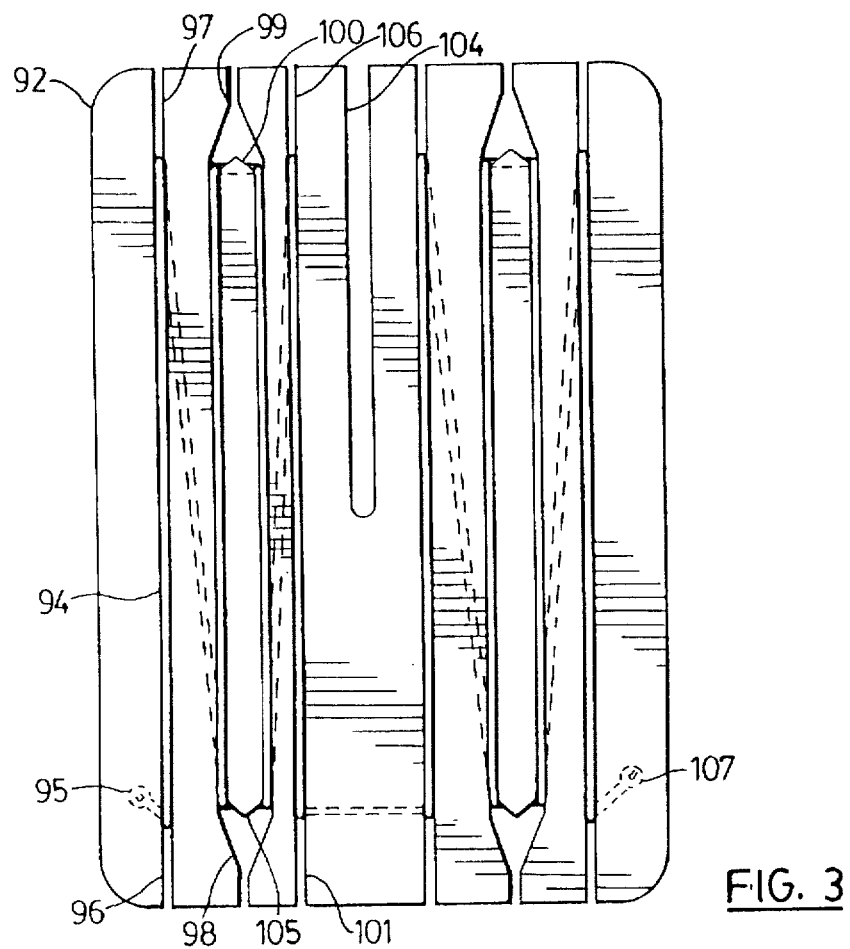
FIG. 3, which appears between FIGS. 1 and 2, is a plan view of an electric element of the cooking appliance of FIG. 1.
Figure 7:
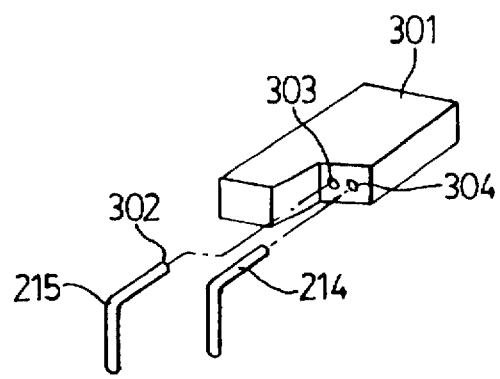
FIG. 7 is an alternate fastener for releasably joining upper parts of a cage.

FIG. 3 shows the electrical heating panel 92, looking at the face which is towards the inside of food heating chamber 30. The panel has an electrical heating ribbon element 94, which is wound around the panel 92 as shown. Beginning at the left hand side, the element 94 is fixed at a connector 95, which is for connecting ribbon element 94 to an electrical power source. It is then brought through a notch 96 and passes up the front face to a top notch 97. The element 94 then passes downwardly along the back face to a further notch 98, which is adjacent to notch 96. From notch 98, element 94 passes upwardly along the front face to notch 99. The notch 99 has an upwardly directed point 100 and the element 94 passes around the point 100 on the rear face, and then downwardly, along the front face to notch 98 which has a downwardly directed point 105. Element 94 passes around point 105 on the rear face and then upwardly along the rear face to a further notch 106. Element 94 then passes downwardly along the front face to notch 101. The element 94 then passes across to the right hand half of the panel 92, across the rear face, and the pattern described above is repeated, in reverse order to connector 107.

The panel 93 carries an element 94 in an identical manner to that described above in respect of panel 92. Because there are two panels 92, 93 the food heating chamber 30 is heated from opposed sides, while the bread heating chambers 32, 34 are only heated from one side. When buns are used, heating is wanted only on the open face of the half bun. With bread slices, it may be desirable to have heating elements on opposed sides of the bread so that both sides of the slice are toasted.

As shown in FIGS. 1–3 the first heating elements facing the food chambers and the second heating elements facing the bread chambers are formed from a single length of heating ribbon. This is primarily for ease of manufacture and keeping costs low. However first and second elements may be kept electrically separate so that they may be heated separately if desired.

It will also be understood that heating of the meat or buns may be accomplished using bar heaters, e.g. Calrod® heaters, instead of ribbon elements. In any event, the ribbon element or bar is heated by connecting the ribbon or bar to an electrical power source.

It will be appreciated by those skilled in the art that meat requires more heat to become cooked than does a bun to become warmed or toasted. Further, the rate of heating of either the meat or the bun is dependent upon the amount of radiant heating impinging upon the bun or the meat. The amount of radiant heating, in turn, is dependent upon the number of heating elements, the distance the food is away from the heating elements and whether there is a plate interposed between the food/bun and the heating elements. In order to provide for the simultaneous heating of the bun and the meat, and in order that the heating of the bun and the meat are completed simultaneously, a number of techniques may be utilized in the present invention.

In one method there is a single timer and the first and second heating elements are both heated simultaneously. In such a method, in the bun heating chamber a spacing grill 102 may be provided, formed by a plurality of outwardly and then downwardly extending spacing elements 103. The grill 102 spaces the bun away from the elements 94, thereby slowing the speed at which the bun heats or toasts. Secondly, the faces of the panels 92, 93 in the bun heating chamber may have a smaller number of the elements, e.g. only half, as are provided on the faces of panels 92, 93 in the meat heating chamber. This is illustrated in FIG. 3 where there are shown eight ribbons of element 94 on the front face (for the food heating chamber 30) and only four ribbons on the rear face (for the bun heating chamber 32 or 34).

As indicated hereinbefore, it may be desirable to toast bread slices instead of a bun in each bread heating chamber. In such a case another heating element may be present, for heating or toasting the second side of the slice. As will be seen from FIGS. 1 and 2, the openings 31, 33 and 35 of chambers 30, 32 and 34 respectively are substantially semi-circular in order to hold a half-bun in place easily. For cooking appliances using bread slices, the cooking appliance may be designed with rectangular openings especially sized for accommodating bread slices. Alternatively the openings to the bread chamber may be shaped to accommodate either bun halves or bread slices. As will be understood it may also be necessary to provide an extra plurality of spacing elements similar to spacing grill 102 to position the bread or bun correctly.

A bread chamber which can accommodate bread or half-buns is relatively wide and it is preferred to have means, which will hold the bread or half-bun close to the heating elements, e.g. against spacing elements, so that even heating or toasting is accomplished. One such means is a light spring means (not shown) which pushes the bread towards the spacing elements when bar 86 is in its lowered position. The light spring means would be withdrawn when bar 86 is in its raised position, for ease of removal of the bread or bun-half.

For a cooking appliance with two meat chambers, it is preferable to have bread chambers, each of which is sized to house two bun halves. The bun halves may be side by side or one on top of the other, with the open faces facing the second heating element.

Returning to FIGS. 2 and 3, slots 104 are formed in each of the panels 92, 93 of the chambers 30, 32, 34 to enable the horizontal bar 86 to extend into all of the chambers 30, 32, 34 and to enable free movement up and down. Bar 86 may also have platforms (not shown) attached thereto for supporting the meat and/or bread. Bar 86, either with or without platforms may sometimes be referred to as an elevator. A spring, not shown in FIG. 2, is associated with the horizontal bar 86 and biases the bar 86 into the raised position. At one end of the bar 86 is attached bar handle 22, shown in FIG. 1. By depressing the bar handle 22, the horizontal bar 86 is also depressed, thereby lowering the elevator fully into the heating chambers 30, 32 and 34. There is a catch mechanism (not shown), understood by those skilled in the art, e.g. a mechanical or magnetic latch, for keeping horizontal bar 86 depressed. The catch mechanism is released after the timer has timed out and the meat and bun have been heated or cooked, thus allowing bar 86 to rise to its biased, raised position.

When flat food portions are contained in a cage, it may not be necessary for an additional support means, e.g. an elevator, to support the flat food portion. In such an instance the elevator is only present in the bread chambers. Flat food will be lowered into the food chamber in the cage and part of the cage will rest on the lip of the opening to the food chamber.

The heating elements are powered when bar 86 is in the lowered position and the power transmitted to the heating elements and the time of exposure to radiant heat may be controlled by control means not shown but known to those skilled in the art. It will be appreciated that the length of time that the heating elements are producing radiant heat, and the length of time that the meat and the buns remain in the heating chambers can be varied by known means. On the outside of the cooking appliance 10, the timer adjuster 24 can be used to select a pre-determined amount of time that the meat and/or bun is exposed to the energized heating elements thereby enabling the user of the cooking appliance 10 to select any desired degree of cooking, heating or toasting.

Other techniques of heating the food and bun may be utilized. One method in particular involves a dual timer. Such a method is not only applicable to the flat food device of the present invention but may also be applied to the toaster of U.S. Pat. No. 4,901,631. In this method, food is placed in the meat heating chamber 30 and bar handle 22 is depressed until it reaches its lowest position and latches bar 86 in a temporary lock. The latch mechanism triggers a control mechanism which allows electric current to flow to electric elements 94. The electric elements 94 give off radiant heat and the food, e.g. steak, is allowed to cook from the radiant heat. After a certain predetermined first time (controlled by a dual timer), e.g. 8 minutes, the latch mechanism is caused to release and the bar 86 moves upward to its biased, upper position. The electric current is shut off at the release of the latch. Bun halves can then be placed in heating chambers 32 or 34 and bar handle 22 is again depressed until it reaches its lowest position and latches bar 86 in a temporary lock. The latch mechanism again triggers electric current to flow to electric elements 94. After a certain predetermined second time (also controlled by the dual timer), e.g. 2 minutes, the latch mechanism again is caused to release and the current shut off. The steak finishes cooking in the last 2 minutes and the bun is toasted, thus allowing steak and bun to be finished cooking at the same time and be ready for eating. It will be understood that the dual timer may be pre-programmed, or may be programmed at will to alter the first and second times. It will be understood that the dual timer in essence times the total cooking time but permits an interruption in the cooking cycle. It is obviously necessary for the first and second times to be consecutive. The interruption in cooking is generally only as long as it takes to insert the bun into the bun chamber.

An alternate method is for the dual timer to set off an alarm of some sort, e.g. a buzzer, flashing light or vocal instruction to alert the cook to insert the bun. It may not be necessary in this instance to interrupt the electrical current or release the latching mechanism. However, if the cook is busy, then it is possible to miss the bun-insertion time and thus the bun may be undertoasted or not toasted at all.

Another method for ensuring that the meat is properly cooked and the bun is warmed is for there to be a fixed plate interposed between the heating elements in the bread chamber and the bread. In one embodiment, a single plate in each bread chamber is used. In this method, the meat and buns are inserted into the appropriate chambers at the same time. As the plate limits the amount of radiant heat received by the bun, the bun becomes warmed while the meat cooks. If there are perforations in the plate, the bun may become toasted, depending on the number and size of perforations.

Figure 8:
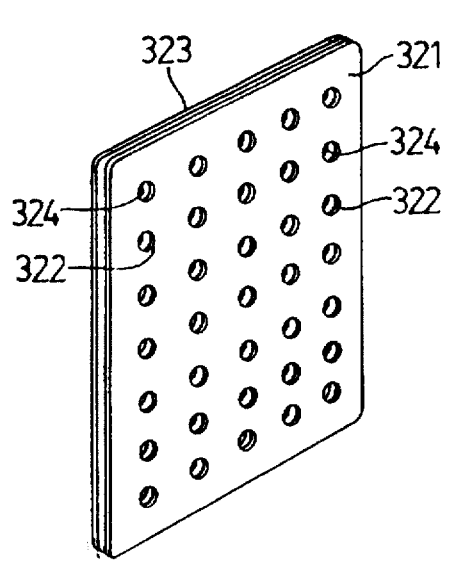
FIG. 8 is a perspective view of two plates in register, used for controlling the amount of heat reaching food portions.
Figure 9:
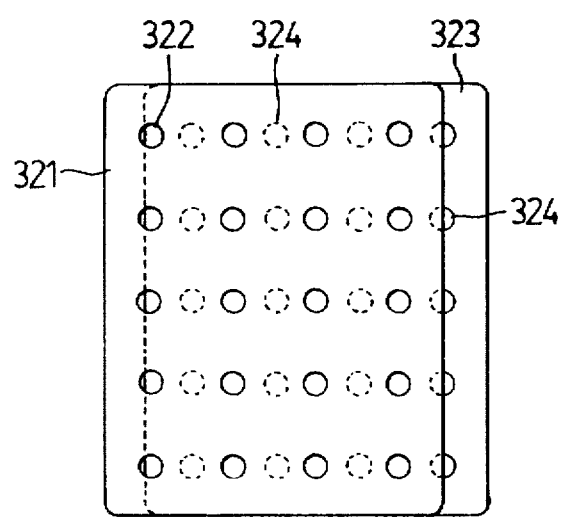
FIG. 9 is a face view of the two plates of FIG. 8, out of register.

For cooking appliances where it is desirable to have an option whether the bun is warmed or toasted, there may be two plates in each bread chamber. Examples of such plates are shown in FIGS. 8 and 9. A first plate 321 is fixed and has perforations 322 therein. The perforations typically may be 3–10 mm in diameter. A second plate 323 is movable and has perforations 324 similar in size and location to the perforations in plate 321. In one position, shown in FIG. 8, movable plate 323 is positioned in face-to-face relationship with fixed plate 321 so that perforations 322 and 324 coincide, i.e. plates 321 and 323 are "in register". In such a position, radiant heat from electrically heated ribbons may pass freely through perforations 322 and 324 and strike the bun. In due course, the face of the bun would become toasted. When movable plate 323 is moved so that perforations 324 no longer coincide with perforations 322, i.e. plates 321 and 323 are "out of register", as shown in FIG. 9, radiant heat cannot pass through the perforations to the bun. This severely limits the amount of heat reaching the bun and therefore the bun is warmed rather than toasted. Movable plate 323 may be moved manually by a lever mechanism (not shown).

Referring again to FIG. 2, there is also shown a grease drip tray 178 which is insertable between the bottom 19 and the heating chambers 30, 32 and 34. In this manner any food particles or grease that may fall from the food being heated will be caught in the tray 178 which can later be easily removed for cleaning.

A cage 50 may be used to align the meat vertically in the meat chamber. Cage 50 may also serve to hold crumbly meats, e.g. certain types of hamburgers, from disintegrating during cooking. Cage 50 comprises two wire grills 51 and 52 which are hinged together at hinges 53 and 54. Cage 50 also has support arms 55 and 56 which are adapted to rest on the top of cooking appliance 10, thus allowing grills 51 and 52 to depend therefrom and nest inside meat chamber 30. Hinges 53 and 54, and grills 51 and 52 are preferably designed to space grills 51 and 52 apart a few millimetres, for example with L-shaped spacer 57, and thus provide more uniform clamping of the meat between the grills. Preferably at least one of the support arms 55, 56 has means to ensure that the handle remains cool enough for handling without the cook's fingers getting burned. One means for providing this is a plastic connector or fastener 301 which also functions to hold grills 51 and 52 together.

A preferred cage is shown in FIGS. 4, 5a and 5b, and suitable fasteners are shown in FIGS. 4, 6a, 6b and 7.

FIG. 4 shows cage 200 which comprises a floor member 201, a first wall member 206 and a second wall member 207, and releasable fasteners 221. Floor member 201 has two longitudinal edges 202 and 203. Floor member 201 is shown in FIG. 4 as having holes 225 therein, to assist in draining of fat. Longitudinal edge 202 forms a hinge connection for the first end 204 of wall member 206. Longitudinal edge 203 forms a hinge connection for the first end 205 of wall member 207.

Wall member 206 comprises a wire frame 208 joined by wire cross-members 210. Similarly, wall member 207 comprises wire frame 209 joined by wire cross-members 211. The second end, i.e. the upper end, of wall member 206 has frame member 208 bent at 214 for connection to member 216 of fasteners 221. Similarly, frame member 209 is bent at its second end at 215 for connection to member 217 of fastener 221. As will be seen from FIG. 4, wall members 206 and 207 have bends 222 and 223 respectively, close to longitudinal edges 202 and 203. In FIG. 4, the bends are such that the distance A between major portions of wall members 206 and 207 are less than the widths of floor member 201.

The second ends, i.e. the upper ends, of wall members 206 and 207 are held together temporarily by a releasable fastener 221. The two halves of fastener 221 are shown in more detail in FIGS. 6a and 6b. Male fastener 217 has a protuberance 219 which extends on both sides of male fastener 217. The protuberance 219 is situated in throughhole 232. Female fastener 216 of fastener 221 has two cooperating protuberances 230 and 231. Protuberance 230 is stationary while protuberance 231 may be moved, e.g. using knob 220. Movable protuberance 231 is spring-biased towards protuberance 230. Although not shown in the drawings, there are equivalent protuberances 230 and 231 on both sides of female fastener 216. In operation, male and female fasteners 217 and 216 respectively are brought together so that male protuberance 219 fits between female protuberances 230 and 231. The spring-loading feature of protuberance 231 allows protuberance 231 to move away from protuberance 230 and thus permit male protuberance 219 to nestle between protuberances 230 and 231. The male and female protuberances have cooperating latches thereon so that when fasteners 216 and 217 are brought together, the male and female protuberances latch together. Thus, the male and female fasteners 217 and 216 respectively are held together. They may be released by moving knob 220, which is connected to protuberance 231, such that protuberance 231 disengages from male protuberance 219, and thus releases the latch.

FIG. 5a is an end view of another embodiment of the cage. This has a straight wall 223 which is hingedly attached to floor member 201. The cage also has a bowed wall 224, which is also hingedly attached to floor member 201. In the configuration shown in FIG. 5a, the bow is such that the distance B between the majority of walls 223 and 224 is not as wide as the width of floor member 201. When fastener 221 is released, the walls can be swung around floor member 201, by the hinges, until the walls are on the opposing side of floor 201. This configuration is shown in FIG. 5b. It can be seen that the bowed wall 224 now bows outwards and thus the distance C between walls 223 and 224 is wider than the width of floor member 201.

Other types of temporary locking means for the fasteners may be used. A simpler type of fastener comprises a fastener member 301 which is attached to and swivelable about the rod adjacent bend 215 (see FIG. 7). Such fastener also has one or two holes 303 and 304 into which the rod adjacent to bend 214 may be push fitted.

It will thus be seen from the description of cage 200, in FIGS. 4, 5a and 5b, that the user may select a configuration of the cage which is suitable for the particular thickness of the food which is to be heated or cooked.

It will be recognized that the floor member 201 may be a solid sheet, may be reticulated or may be relatively open and made from a wire structure. Similarly, the wall need not be made from wire. However, the wall should be sufficiently open to permit radiant heat to impinge upon the food inside the cage.

It is preferable that the cage, some of the internal surfaces in the cooking appliance and the tray be coated with a non-stick material such as a fluoropolymer resin. Two such non-stick fluoropolymer materials are available from E.I. du Pont de Nemours and Company under the trade marks TEFLON and SILVERSTONE.

Although not shown in the drawings, it is preferable for the food chambers to have guides therein which centre the cage when the cage is placed in the food chamber. This is to ensure that the food is centred in the food chamber and thus each side of the food portion gets similar amounts of radiant heat. This avoids over-cooking on one side and under-cooking on the other side.

In operation of the single timer version, a hamburger or similar food is placed in cage 50, and cage 50 is inserted into meat heating chamber 30 until the bottom of cage 50 rests on bar 86 or a platform attached thereto. Two bun halves are each dropped into bread heating chambers 32 and 34 until they too rest on bar 86 or a platform attached thereto. Timer adjustment knob 24 is rotated until an indicator on knob 24 reaches a predetermined position identified on dial 26, the position depending on the expected cooking time for the type of food about to be heated or cooked. Bar handle 22 is depressed, thus causing bar 86 to lower and consequently causing the hamburger and bun halves to be lowered more fully into meat chamber 30 and bun chambers 32 and 34.

When bar handle 22 reaches its lowest point, it is latched in position by a latch mechanism which also triggers a control mechanism which allows electric current to go to electric elements 94. The elements glow and release radiant heat to the hamburger. In a preferred embodiment there is a metal plate between the elements an the bun faces. The bun is therefore warmed rather than toasted. As the hamburger heats, grease is released and drips down the outer surface of the hamburger and into tray 178. The radiant energy produces carmelization of the sugars and proteins on the surface of hamburger, thus giving it a distinctive taste. Simultaneously with bar handle 22 being latched, a single timer is started and when an appropriate time has elapsed, the latch mechanism is unlocked, thus allowing bar 86 to move to its biased, upper position, e.g. under spring action. The bun, being warmed, and the hamburger, being cooked, are then ready for removal and eating.

For the dual timer version of the invention, there may be a single timer adjustment knob 24 which is used to select a predetermined total cooking time for the food, e.g. meat. However, the dual timer has an interrupter circuit which automatically interrupts the cooking time to permit the bun to be inserted at a later time, e.g. 2 minutes before the end of the total cooking time. Alternatively the cooking appliance may have two timer adjustment knobs, one for the first time interval and one for the second time interval.

It will be understood that the single timer version is preferable because the bun and meat portions have the same heating times and is easier to make and operate. As indicated hereinbefore, a preferred heating device has two food chambers and two chambers which can accommodate bread or half-buns.

For ease of cleaning the cooking appliance it is desirable to coat the cooking cage, drip tray and other surfaces which may be contacted with food or fat with a high-temperature resistant non-stick finish such as polytetrafluoroethylene. Useful commercial coatings are available under the Teflon and Silverstone trade marks.

In experiments with a cooking appliance as described in reference to FIGS. 1 to 3 it has been found that with a 900 watt element for a single food chamber and two bun chambers (without plates), flat foods took from 5 to 10 minutes to cook and buns from 2 to 4 minutes to toast. Sliced bread did not toast as well as buns because only one side of the bread was toasted, causing the bread to "warp". Vegetable patties, round pork sausage patties, and fish fillets took about 5 to 6 minutes to cook, beef burgers, back bacon and steak took about 8 minutes and chicken breast, pork schnitzel and Italian sausage took about 10 minutes. It will be understood that heating/cooking times will vary from the times just described, depending on the heat capacity of the elements, the thickness of the foods, the water and fat content of the foods, among other factors.

It will be appreciated by those skilled in the art that the foregoing description relates to particular preferred embodiments of the present invention and that other variations are possible within the broad scope of the invention. Some of these variations have been suggested above and others will be apparent to those skilled in the art.

We claim:

1. A cooking appliance for simultaneously heating at least one bread portion and at least one substantially flat food portion, said cooking appliance comprising:
   (a) at least one food chamber, where each chamber is for containing a flat two-sided food portion in a vertical position;

(b) first electric element means for heating both sides of the food portion in each food chamber;

(c) at least one bread chamber for containing a bread portion in a vertical position;

(d) second electric element means for heating at least one vertical surface of the bread portion;

(e) food support means for supporting the food portion in the food chamber in a position adjacent the first electric element means to allow heat from the first element means to impinge on the sides of the food portion; and (f) bread support means for supporting the bread portion in the bread chamber in a position adjacent the second element means to allow heat from the second element means to impinge on the vertical surfaces of the bread portions.

2. A cooking appliance according to claim 1 wherein the food support means and the bread support means comprise an elevator which may travel between raised and lowered positions, said lower position allowing the food and bread portions to be fully contained in their respective chambers while being exposed to the heat, and the upper position allowing part of the food and bread portions to extend above their respective chambers.

3. A cooking appliance according to claim 1 wherein the food support means comprises a removable cage for holding the flat food in the food chamber and the bread support means comprises an elevator which may travel between raised and lowered positions, said lower position allowing the bread portion to be fully contained in the bread chamber while being exposed to the heat, and the upper position allowing part of the bread portion to extend above the bread chamber.

4. A cooking appliance according to claim 1 wherein there is a metal plate between the second electric element means and the bread portion.

5. A cooking appliance according to claim 2 wherein supplementary support means for the food chamber is a removable cage for holding the food.

6. A cooking appliance according to claim 1 additionally comprising:

(g) an elevator control means for manipulating the elevator to the lower position, for temporarily locking the elevator in the lower position; unlocking means to release the elevator from its temporarily locked lower position, and return biasing means for urging the elevator to its upper position;

(h) electrical control means for allowing electric current to heat at least the first element means when the elevator is in its locked lower position, and for allowing electric current to heat the second element means when the elevator is in its locked lower position;

(h) double timer means, i) for controlling a first length of time when electric current is heating at least the first element means, and for releasing the elevator from its locked position, and ii) for controlling a second length of time, separate from the first length of time, when electric current is heating the first and second element means, and for releasing the elevator from its locked position.

7. A cooking appliance according to claim 6 wherein the timer has adjusting means for controlling the first and second lengths of time.

8. A cooking appliance according to claim 7 wherein the electrical control means and the double timer means allow the first and second element means to be heated during the first and second lengths of time.

9. A cooking appliance according to claim 1 wherein there are two plates, in face to face contact, each with perforations therein, said plates being placed between the second electric element means and the bread portion; and wherein there is control means for moving one of the plates relative to the other plate so that in a first position, perforations in both plates are in register and perforations in one plate are aligned and correspond to perforations in the other plate, and in a second position the perforations in both plates are not in register.

10. A cooking appliance for heating a food portion, said cooking appliance comprising:

a) at least one chamber for containing a food portion;

b) heating means for heating at least one side of the food portion;

c) two plates, in face to face contact, each with perforations therein, said plates being placed between the heating means and the food portion; and d) control means for moving one of the plates relative to the other plate so that in a first position, perforations in both plates are in register and perforations in one plate are aligned and correspond to perforations in the other plate, and in a second position the perforations in both plates are not in register and perforations in one plate are not aligned and do not correspond to perforations in the other plate.

11. A removable cooking cage for holding food in a heating chamber of a cooking appliance, wherein the cage has a floor member with two longitudinal edges and a width between said longitudinal edges, a first and a second wall member, each wall member having first and second ends; the first ends of each wall member being hingedly attached to a longitudinal edge of the floor member, and the second ends of each wall member being able to be temporarily joined to one another with at least one releasable fastener; said wall members being shaped so that when both wall members are temporarily joined on one side of a plane through the width of the floor member, the distance between portions of the wall members is greater than the width of the floor member, and when both wall members are temporarily joined on the opposing side of the plane through the width of the floor member, the distance between said portions of the wall members in less than the width of the floor member; the wall members also being constructed to allow heat to reach food when the food is trapped between the wall members.

12. A cooking cage according to claim 11 wherein the walls are bowed.

13. A cooking cage according to claim 11 wherein a portion of each wall, adjacent to the hinge is at an angle relative to a plane through the remaining portion of each wall.

14. A cooking cage according to claim 11 wherein the second ends of the wall have releasable fasteners for temporarily joining said second ends.

15. A cooking cage according to claim 11 wherein the walls comprise a wire frame with wire cross-members.

* * * * *